April 14, 1964    W. G. GORMAN    3,128,924
METERED VALVE CONSTRUCTION
Filed April 13, 1961
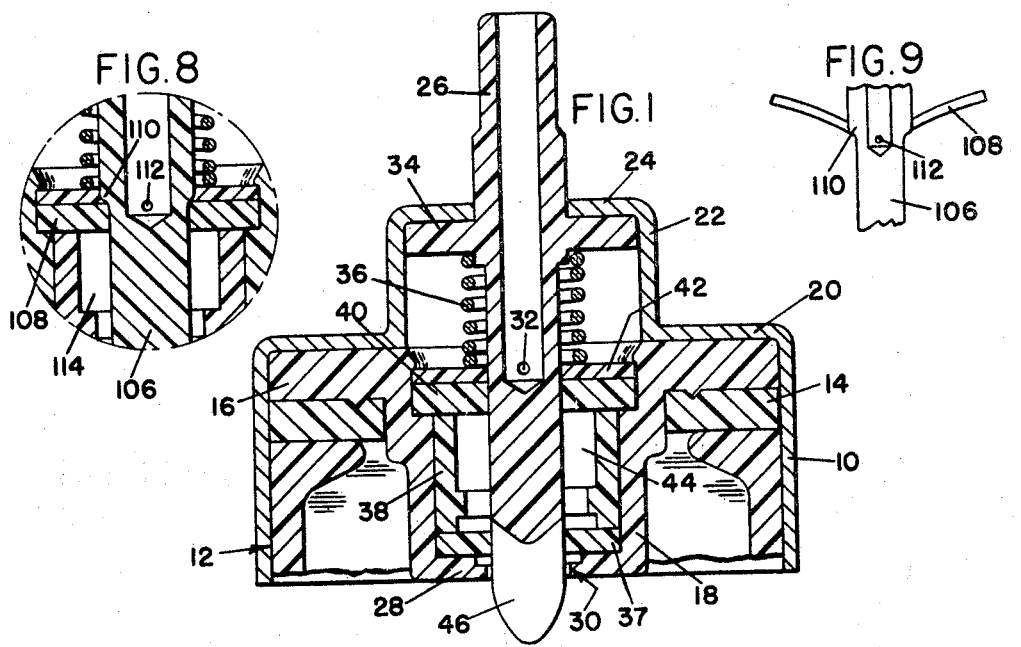
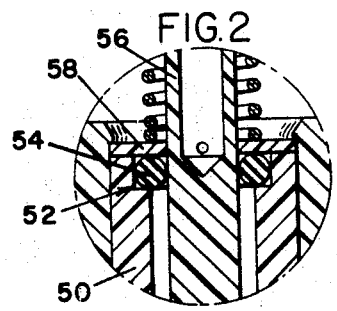
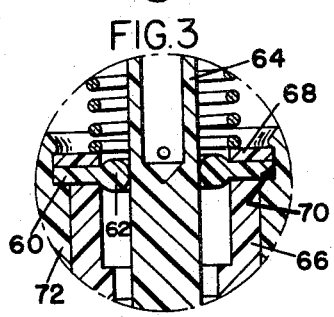
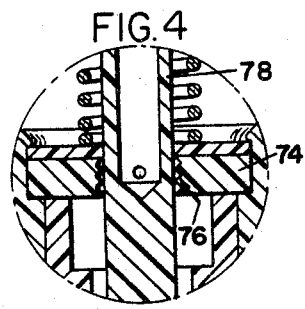
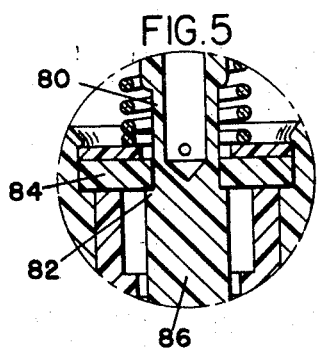
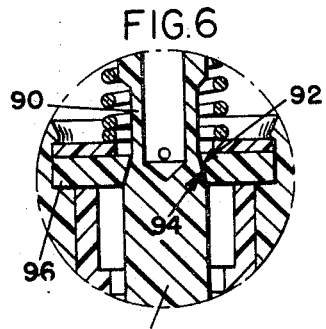
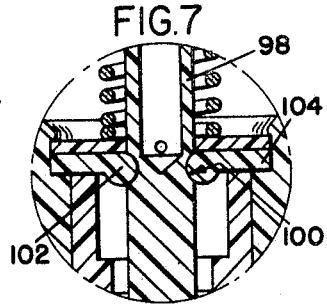
INVENTOR
WILLIAM G. GORMAN
by Charles R. Fay
ATTORNEY 3,128,924
METERED VALVE CONSTRUCTION
William G. Gorman, Albany, N.Y., assignor to Sterling
Drug Inc., New York, N.Y., a corporation of Delaware
Filed Apr. 13, 1961, Ser. No. 102,777
7 Claims. (Cl. 222—394)

This invention relates to a new and improved valve construction particularly of the type presenting metered amounts of material to be expressed from a container adapted for aerosols, and particularly relating but not limited to the pharmaceutical field, the new construction obviating in general problems involved in such devices in the prior art. These problems involve in part frequent non-functioning of the valve stem due to corrosion, stickiness, etc.; leaking of the contents of the container around the stem; failure of the prior art valves to properly operate due to tilting of the valve stem; and general fragility of the parts particularly with respect to thin metal parts in use, etc.

One of the principal objects of the present invention resides in the provision of a new and improved valve for aerosols including a rigid stem construction which has three bearing surfaces at spaced points, eliminating wabble or canting of the stem construction in the operation thereof; and the provision of a new and improved plastic tank construction which can be easily varied as to capacity by removal and replacement of a novel part; and having a construction avoiding the usual deformation and leakage of some of the elastic seals currently in use.

Further objects of the invention include the provision of a new and improved rubber or similar elastomer plug as a metering chamber; a novel combination of such plug and tank gaskets and stem gaskets, providing for simpler assembly and control of quality of the device; and the provision of a new and improved stem construction which obviates bulges or expanded portions thereof which tend in the prior art to deform or press into the gasket components, thus providing a simple and effective metering system with positive "open" and "close" positioning of the stem and valve parts which are constructed to avoid sticking.

Further objects of the invention relate to new and improved sealing gaskets providing a tighter seal between the tank gasket and the valve stem itself, this invention presenting several modifications of the cooperative construction between the valve stem and the gasket to lessen the sliding friction of the valve stem with relation to the gasket while at the same time improving the sealing qualities thereof and preventing leaking.

The invention further relates to arrangements and combinations of parts which will be hereinafter described and more particularly set forth in the appended claims.

Reference is to be had to the accompanying drawings, in which

FIG. 1 is a central section through a valve construction showing a form of the present invention;

FIGS. 2, 3, 4, 5, 6, 7 and 8 are similar sections with parts omitted showing modifications of the cooperating construction of the valve stem and the tank gasket, and FIG. 9 is a diagrammatic view showing an action of the valve gasket.

In illustrating the present invention, reference is made to FIG. 1 wherein there is shown a valve construction adapted to be applied to an aerosol container as for instance by means of a ferrule 10. This ferrule is substantially cylindrical in design and is adapted to be deformed to grasp the aerosol container at the top edge thereof as at the mouth. A form of such container is indicated generally at 12 and it will be seen that the ferrule also clamps an annular body or sealing gasket 14 to the rim of the container 12 and at the same time mounts a tank flange 16 on the gasket 14. The flange 16 is an integral part of the tank 18 which is thus held in position and depends through a central opening in the body or sealing gasket 14.

The ferrule is provided with extension portions to form the construction shown wherein the ferrule rises in steps as by its inwardly directed flange 20, upright cylindrical portion 22, and a second inwardly directed flange 24. The flange 24 is centrally apertured and slidably receives the valve stem 26. The valve stem 26 extends down through the ferrule and partly into the container 12 through the tank, the bottom wall 28 of which is provided with an opening 30 for this purpose. As shown in FIG. 1, the valve stem is in its uppermost position, closing the aerosol container by closing the exit port 32 in the valve stem. This port provides the means whereby the charge of the material to be expressed finds its way through the valve stem to the point of discharge.

The valve stem is provided with a flange 34 which limits the upward motion thereof under influence of a compression spring 36 normally holding the parts as shown but allowing displacement of the valve stem downwardly to a point where the exit port 32 is exposed to a metering chamber to be described.

The tank 18 has a depending cylindrical portion between flange 16 and its bottom wall 28 and in this portion on the wall 28 there is disposed a valve stem gasket 37 surrounding the valve stem at the lower portion thereof. On the gasket 37 there is a cylindrical plug member 38 extending between stem gasket 37 and the tank gasket 40, the latter being held in position by a washer 42 and the spring, against the top edge of the plug 38. The plug 38 has a diameter larger than the valve stem and this forms a metering chamber indicated at 44.

The valve stem is provided with a slot 46 at its lower end and it will be seen that in FIG. 1 this slot forms communication between the interior of the aerosol container and the metering chamber, but when the stem 26 is moved downwardly, it completely fills the opening in the stem gasket 37, closing off the aerosol from the metering chamber; at the same time the exit port 32 comes into communication with the metering chamber and thus allows the metered charge to escape. It will be clear that the stem 26 must operate reasonably freely but at the same time must be completely sealed off by the tank gasket to obviate leakage. It is also pointed out that by changing the plug 38 with other plugs of different interior diameters or conformations, the charge is changed to suit conditions, and the same effect could be provided by using extra washers or other means to change the volume of the metering chamber 44.

The valve stem is preferably made of plastic and all the washers and even the tank can also be made of different kinds of plastic which may be found suitable for the parts involved and therefore the entire valve construction has no metal parts for contact with the solution in the container. Corrosion is prevented and hence failure due to corrosion or sticking of prior art metal parts is avoided. The stem is quite rigid and is held in its longitudinal position as above described by the three point bearing contact comprising stem gasket 37, tank gasket 40, and the flange 24 of the ferrule. The plastic tank construction does not require an elastic seal about the tank and uses only the body gasket 14 which of course can be of plastic or rubber. In the prior art, metering valves usually require an elastic seal about the tank and this is subject to deformation and leakage and does not permit the use of plastic materials as in the present case.

The stem construction provided will not bulge or have any expanded portions in it to deform or press into gasket components and this also avoids a former objection to prior art metering valves. The construction provided herein is a simple and effective metering system and provides positive open and closed positioning of the stem.

It is believed that the construction and operation in general of the metering type of aerosol valve above described will be clear to those skilled in the art, and attention is now directed to the modified constructions.

In FIG. 2 there is shown portions of a tank and valve stem, spring, etc. similar to those above described. In this case the plug forming the metering chamber is indicated by the reference numeral 50 and it has at the uppermost edge thereof an interior indented annular recess forming an inwardly directed shoulder as at 52 on which is mounted an O-ring 54. This O-ring is tightly held against the valve stem 56 which is similar to that at 26 and the operation is the same. However in this case it will be seen that due to the formation of the O-ring, friction between the valve stem and the O-ring is less than that between valve stem 26 and tank gasket 40 in FIG. 1, but at the same time the sealing effect is found to be adequate. The O-ring is held in position by the washer 58 which may be similar to that at 42 in FIG. 1.

In FIG. 3 a somewhat similar construction is provided by means of a gasket 60 which is formed with a central opening having at its edge a molded annular bulge 62 minimizing the friction between the valve stem 64 and the gasket 60 as in the case of the O-ring of FIG. 2. In FIG. 3 the plug 66 is somewhat shorter and is flat at its upper edge so as to hold the gasket 60 together with the washer 68. Both the gasket 60 and washer 68 may have a diameter large enough to extend into an indented area at 70 in the tank 72 somewhat in the manner of the washer 42 and tank gasket 40 in FIG. 1.

FIG. 4 shows a construction somewhat similar but in this case the central valve stem opening of tank gasket 74 is provided with a series of spaced ridges at 76 which form line contacts with respect to the valve stem 78. These ridges provide a tight seal while reducing the friction to be expected during motion of the valve stem with respect to the tank gasket.

In FIG. 5 the valve stem is reduced in thickness at 80 and this forms a shoulder 82 under the tank gasket 84. The valve stem 86 is of course held in the position shown in FIG. 5 by the spring.

In FIG. 6 the valve stem is indicated at 88 and it is reduced at 90 but in this case there is provided a conical surface at 92 which abuts the inner periphery of the tank gasket 96 at 94.

In FIG. 7 the valve stem at 98 is reduced in section on the curved surface at 100 to fit the curved surface of the annular enlargement 102 on the tank gasket 104. In this case there is a very good seal but a little more friction is present. An extremely tight seal is maintained by the interengagement of the reduced portion of the valve stem with the enlargement 102 of the gasket.

In FIG. 8 the construction is somewhat the same as in FIG. 5 but the valve stem is reduced at 106 within and below the tank gasket 108 and this forms the shoulder 110 above the gasket rather than below it as in FIG. 5. In this case it is more difficult to depress the valve stem 106 but in any event the pressure of the propellant in the container forces the gasket against the shoulder 110 of the valve stem and gives it a tighter seal than the purely peripheral type of seal. The nature of the cooperation between the valve stem and the gasket 108 depends upon the dimensions of the shoulder 110 and the degree of flexibility of the gasket. Thus in the case of a relatively small shoulder, the valve stem upon actuation would be forced completely through the deformed gasket, see the diagram of FIG. 9; but on the other hand if the flange or shoulder is large it is not possible to overcome the friction and in this case the shoulder at 110 will have to distort the gasket 108 until such time as the exit port 112 is freed of the gasket to be exposed to the metering chamber 114.

This application is a continuation-in-part of Serial No. 851,167, filed November 5, 1959.

Having thus described my invention and the advantages thereof, I do not wish to be limited to the details herein disclosed, otherwise than as set forth in the claims, but what I claim is:

1. A metering valve construction for controlling the discharge of fluid material, under pressure from a container, said valve construction comprising a valve stem, a one-piece hollow tank of generally tubular shape having an apertured bottom wall, an exterior annular flange on said tank, an apertured gasket located in said tank in spaced parallel relation to the bottom wall thereof, the apertures in the bottom wall and the gasket being aligned and receiving the valve stem, the aperture in the gasket having an edge conforming to and relatively tightly embracing the valve stem to seal it while still allowing motion of the valve stem, a ferrule having a central aperture coaxial with the first two apertures, said ferrule clamping the flange and thereby the tank to the container, the valve stem including a portion arranged in said ferrule aperture and being guided thereby and by the gasket, a resilient means engaging said stem to normally urge the same in one direction, a reaction element for the resilient means, separate and removable means located in said tank and forming a metering chamber therein, the walls of the metering chamber being spaced at least in part from the surface of the valve stem and the gasket forming a top wall for the metering chamber, spaced exit and filling ports in said stem, said filling ports forming communication of the container with the metering chamber when the valve stem is extended under influence of the spring, and the exit port forming communication of the metering chamber to an exterior point when the stem is pressed relatively inwardly with respect to said tank against the spring action, said ports each being closed when the other is open, and means on the gasket, surrounding and bearing on the valve stem, increasing the relative sealing action of the gasket relative to the valve stem while maintaining ease of operation of the valve stem.

2. A metering valve construction as recited in claim 1 wherein said last-named means comprises an annular shoulder on the valve stem, said shoulder having a portion overlying a part of the gasket adjacent the aperture thereof.

3. A metering valve construction as recited in claim 1 wherein said last-named means comprises an annular shoulder on the valve stem, said shoulder having a portion underlying a part of the gasket adjacent the aperture thereof.

4. A metering valve construction as recited in claim 1 wherein the last-named means comprises a seal between the tank gasket and an expanded conical surface of the valve stem.

5. A metering valve construction as recited in claim 1 wherein said last-named means comprises a recess on the valve stem and a corresponding enlargement on the gasket.

6. A metering valve construction as recited in claim 1 wherein said last-named means comprises a series of spaced ridges in the aperture of the gasket, said ridges contacting the valve stem.

7. A metering valve construction as recited in claim 1 wherein said last-named means comprises a rounded surface at the edge of the aperture of the gasket, said rounded surface contacting the valve stem.

References Cited in the file of this patent

UNITED STATES PATENTS

| | | |
|---|---|---|
| 2,744,665 | Carlson et al. | May 8, 1956 |
| 2,788,925 | Ward | Apr. 16, 1957 |
| 2,831,617 | Soffer | Apr. 22, 1958 |
| 2,835,417 | Kiraly | May 22, 1958 |
| 2,869,764 | Collins | Jan. 20, 1959 |

FOREIGN PATENTS

| | | |
|---|---|---|
| 1,033,147 | Germany | June 26, 1958 |